United States Patent [19]

Barber, Jr.

[11] Patent Number: 4,503,748
[45] Date of Patent: Mar. 12, 1985

[54] CHORD DISPLAY DEVICE FOR FRETTED STRING INSTRUMENT

[76] Inventor: Edmund A. Barber, Jr., 42 Fairview Square, Ithaca, N.Y. 14850

[21] Appl. No.: 542,454

[22] Filed: Oct. 17, 1983

[51] Int. Cl.³ .............................................. G09B 15/02
[52] U.S. Cl. ................... 84/474; 84/485 SR; 235/88 R
[58] Field of Search ............... 84/471 SR, 473, 474, 84/480, 485 SR; 235/88 R

[56] References Cited

U.S. PATENT DOCUMENTS

| | | | |
|---|---|---|---|
| 1,556,147 | 10/1925 | Johnson et al. | 84/485 SR |
| 2,001,191 | 5/1935 | Golden | 84/485 SR |
| 2,649,008 | 8/1953 | Bova et al. | 84/474 |
| 3,245,303 | 4/1966 | Patt | 84/485 SR |
| 3,668,967 | 6/1972 | Malis | 84/471 SR |
| 3,969,973 | 7/1976 | Pandapas, Jr. | 84/474 |

Primary Examiner—Benjamin R. Fuller
Attorney, Agent, or Firm—Barnard & Brown

[57] ABSTRACT

A device to display musical chords and notes for fretted string instruments comprising (a) top sheet having a plurality of transparent patterns representing the strings and frets on the fingerboard of the instrument, (b) pivot located at a central point on the sheet, and (c) underlying rotatable disk having a plurality of patterns of spots representing different types of chords. All the fingerboard patterns on the top sheet are identical but each is disposed to display chords in a different musical key. When the rotatable disk is angularly indexed relative to the top sheet, the device displays a plurality of musical chords, differing in position on the fingerboard, in musical key and in chord type. The spots displayed through the transparent fingerboard patterns indicate where the fingers may be placed on the strings and which strings may be left unstopped when a chord is sounded.

14 Claims, 9 Drawing Figures

CHORD DISPLAY DEVICE FOR FRETTED STRING INSTRUMENT

BACKGROUND OF INVENTION

1. Field of Invention

The invention pertains to the class of devices designed to demonstrate the fingering of musical chords on fretted string instruments.

2. Description of Prior Art

Various devices have been disclosed in patents and elsewhere for teaching musical chords to students of fretted string instruments and for reminding experienced musicians of the thousands of different chords available. None of these devices, however, is in popular use. In spite of this prior lack of success, the premise behind the present invention is that a simple, easy-to-carry, easy-to-use, direct-reading chord display device properly priced and distributed will fill a void in the marketplace.

Evidence of the general need for chord display media exists in the many different chord books already in print. These books will probably continue to be popular because they offer a repertoire of chords pre-selected by master musicians and they designate the particular fingers to play each chord.

The present device, however, avoids the bulk, the cumbersome turning of pages and the searching for a chord voicing that may not even be in the book. By comparision, the device is simple, yet offers a complete selection of chords for each of up to 24 or more distinct and most useful chord types in all 24 musical keys.

The following patents best describe the prior art relative to the present invention. All are United States patents.

| | | |
|---|---|---|
| 1,556,147 | 10/1925 | Johnson et al. |
| 2,001,191 | 7/1932 | Golden |
| 3,245,303 | 6/1962 | Patt |
| 3,668,967 | 6/1972 | Malis |

U.S. Pat. No. 1,556,147 introduces the idea of a perforated slide that moves in a slideway representing the fingerboard. The notes are lettered on the slideway in their relative positions as they may be played on the fingerboard. The perforations on each slide are arranged in the finger pattern that may be used to play a certain type of musical chord. When the slide is indexed to a particular note, that note and the other notes which constitute the chord as revealed by that particular slide may be viewed through the perforations. A multiple number of slides are needed for different types of chords and for different finger patterns within each chord type.

U.S. Pat. No. 2,001,191 retains the idea of a perforated slide but brings together more than one type of chord on a much larger slide. Although not claimed, the description states that only one moving part is required. This is a desirable feature but it tends to make the slide large and awkward or to limit the number of chord types that can be displayed in a practical device.

U.S. Pat. No. 3,345,303 substitutes printed indicia for the perforations representing the different finger patterns described above. The simulated fingerboard in this instance is imprinted on a transparent overlay. The overlay is slidable relative to the finger patterns in order to display for each chord the strings and frets on which the fingers may be placed. For each chord type a different sheet of corresponding finger patterns is provided, making it necessary to manipulate a multiple number of sheets in order to display all the chords.

U.S. Pat. No. 3,668,967 retains the idea of a transparent overlay to represent the fingerboard and printed indicia to represent the finger patterns. The finger patterns are formed by two coacting slides that may be moved longitudinally within a transparent sleeve upon which the fingerboard pattern is inscribed. Chords may be displayed on both front and rear sides of the device. The different types of chords that can be displayed are limited by the number of ways the coacting slides may be indexed to each other.

In none of the above inventions is the advice reduced to one moving part with one essential guiding surface and, at the same time, enlarged enough to display as many as 24 or more different chord types simultaneously over the entire range of the fretted string instrument. An aim of the present invention is to provide a practical device that avoids these shortcomings.

SUMMARY OF INVENTION

This invention provides a simple, easy-to-use, direct-reading device for displaying a comprehensive collection of musical chords for the guitar and other fretted string instruments. The device has only one rotatable moving part, is thin and flat, and can be carried in the same case with the guitar or the like. It shows on a simulated fingerboard the finger positions or open strings for up to 24 or more distinct types of chords within the first 14 frets. By ordinary visualization, the display is easily extendible by the user to any additional number of frets.

The device is arranged so several key-related chords may be read in one setting. Subject to choice by the designer, all the ordinary chords of a key-related group can be read in one or two settings. The different chords which the device can display, including different fingerboard positions, chord inversions and musical keys, actually number in the thousands.

The objects of the invention are:

1. To provide a device for musicians to locate quickly the finger positions on fretted string instruments for a large variety of chords and chord types.

To provide a direct-reading display of the finger positions on a simulated fingerboard.

3. To provide a combination of spots and lettered characters to identify each note in the chord.

4. To provide a simultaneous display of certain key-related chords.

5. To provide a system for displaying all the ordinary chords relating to a particular key with not more than two settings of the device.

6. To provide a system that minimizes the movement required between settings for ordinary chords.

7. To provide a device capable of displaying up to 24 distinct types of chords in all 24 keys over the full range of the instrument.

8. To provide a device having only one rotatable moving part in order to assure simplicity.

9. To provide a device having only one essential guiding surface in order to assure mechanical accuracy and ease of operation.

10. To provide a device that is thin and flat so it can be carried in the same case with a guitar or the like.

11. To provide a basic design having a single moving part that is easily extendible to 96 distinct types of chords within a 72 percent larger diameter or with the present diameter and an optical magnifier.

DESCRIPTION OF PREFERRED EMBODIMENT

The following description applies generally to fretted string instruments such as the guitar, mandolin, banjo, ukelele and the like. It describes the present invention in one preferred embodiment for the guitar.

Figure 1:
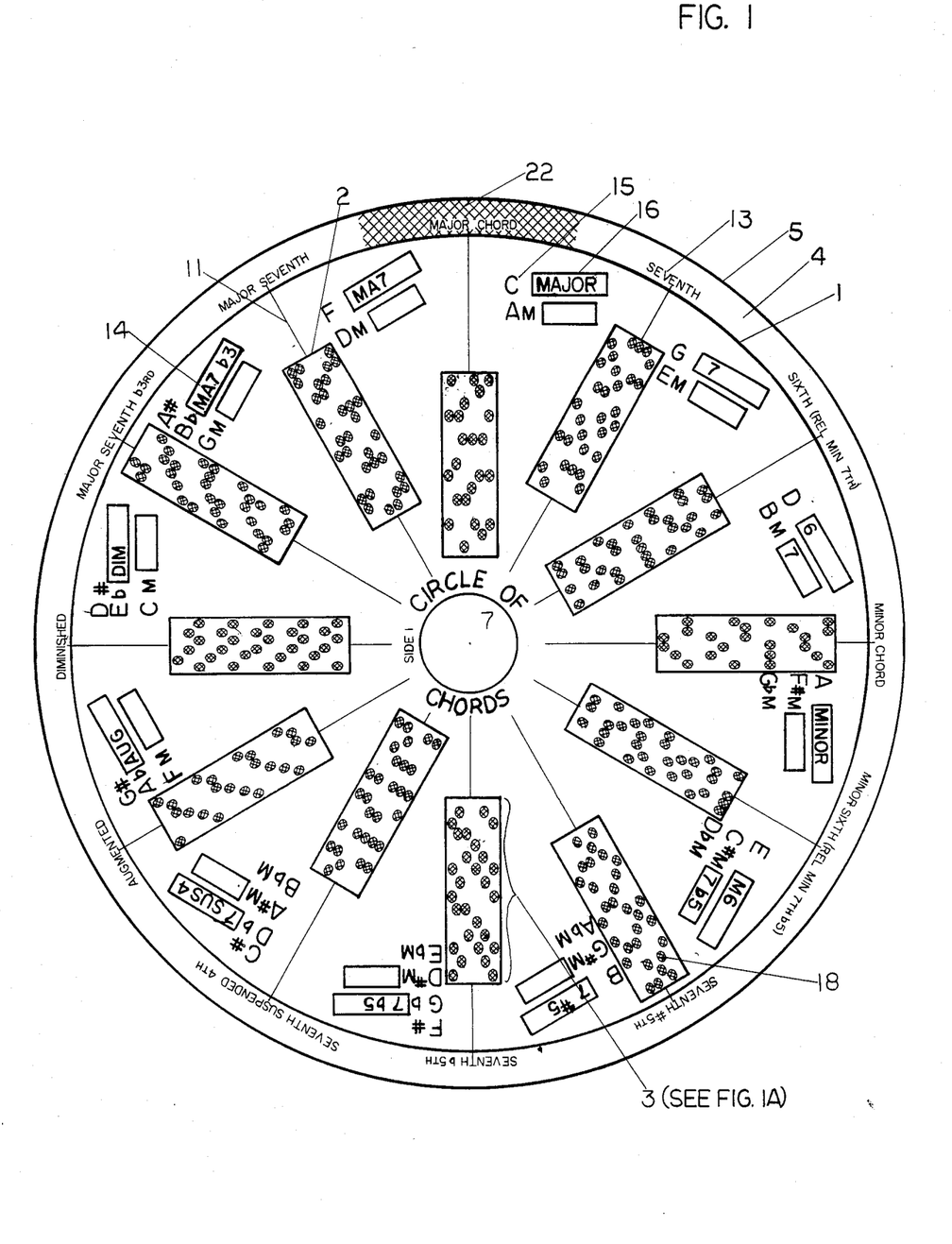
FIG. 1 is a front view (SIDE 1) of the device with the rotatable disk positioned to display 12 sets of chords, including the C MAJOR chords.

On FIG. 1 of the drawings the front sheet 1 overlays the front side 4 of disk 5. By inserting the fingers or a thumb into the center hole 7, one may hold the sheet 1 stationary while rotating the disk 5 to any one of 12 positions for the purpose of displaying musical chords.

Figure 2:
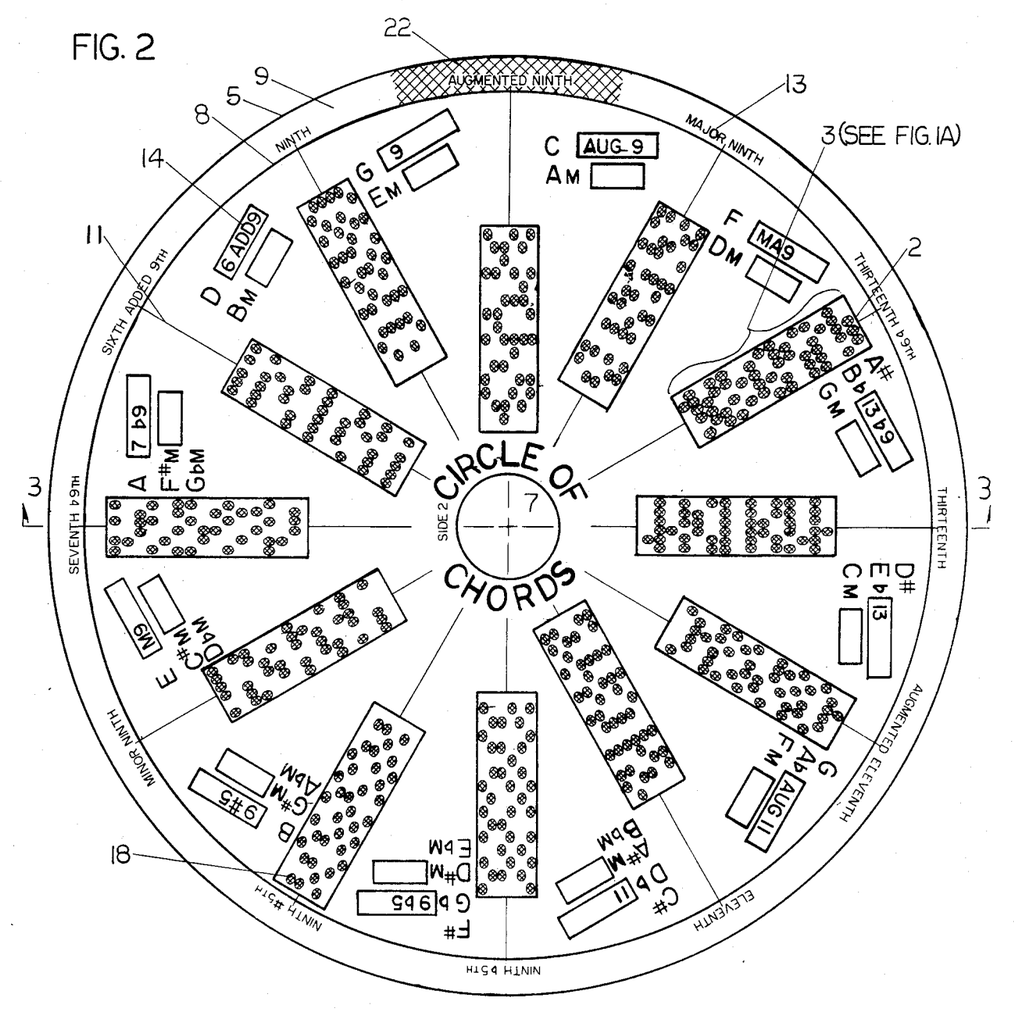
FIG. 2 is a rear view (SIDE 2) of the same device, without rotating the disk from its position in FIG. 1, in order to display on the second side another 12 sets of chords, including the C AUGMENTED NINTH chords.
Figure 3:
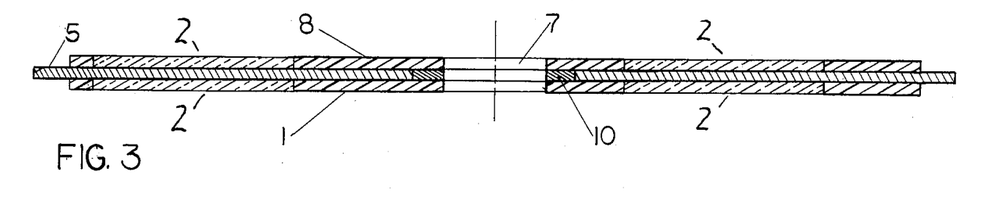
FIG. 3 is a view in cross section along the lines 3—3 in the above-mentioned FIG. 2.

On the rear view of the device, FIG. 2, the rear sheet 8 overlays the rear side 9 of disk 5. Rear sheet 8 is aligned and affixed to front sheet 1 through pivot member 10, shown in cross section on FIG. 3. As with the front side 4, disk 5, including its rear side 9, may be rotated to any of 12 positions to display chords. The front and rear alignment is such that when the disk 5 is positioned to display any chord, all 24 simulated fingerboards are in registration to display chords corresponding to the patterns 6 of spots 18 that may appear.

Several aids are provided to make the device easy to use. The front sheet 1 and the rear sheet 8 are, in effect, stationary disks. Equally spaced on the circumference of each are 12 index marks 11 angularly centered on the 12 simulated fingerboards 3. Correspondingly, the front side 4 and rear side 9 of disk 5 each have 12 equally spaced index marks 12 angularly centered on the patterns of spots 6. Proper positioning of the disk 5 occurs when all 12 index marks 12 are aligned with all 12 index marks 11.

Figure 5:
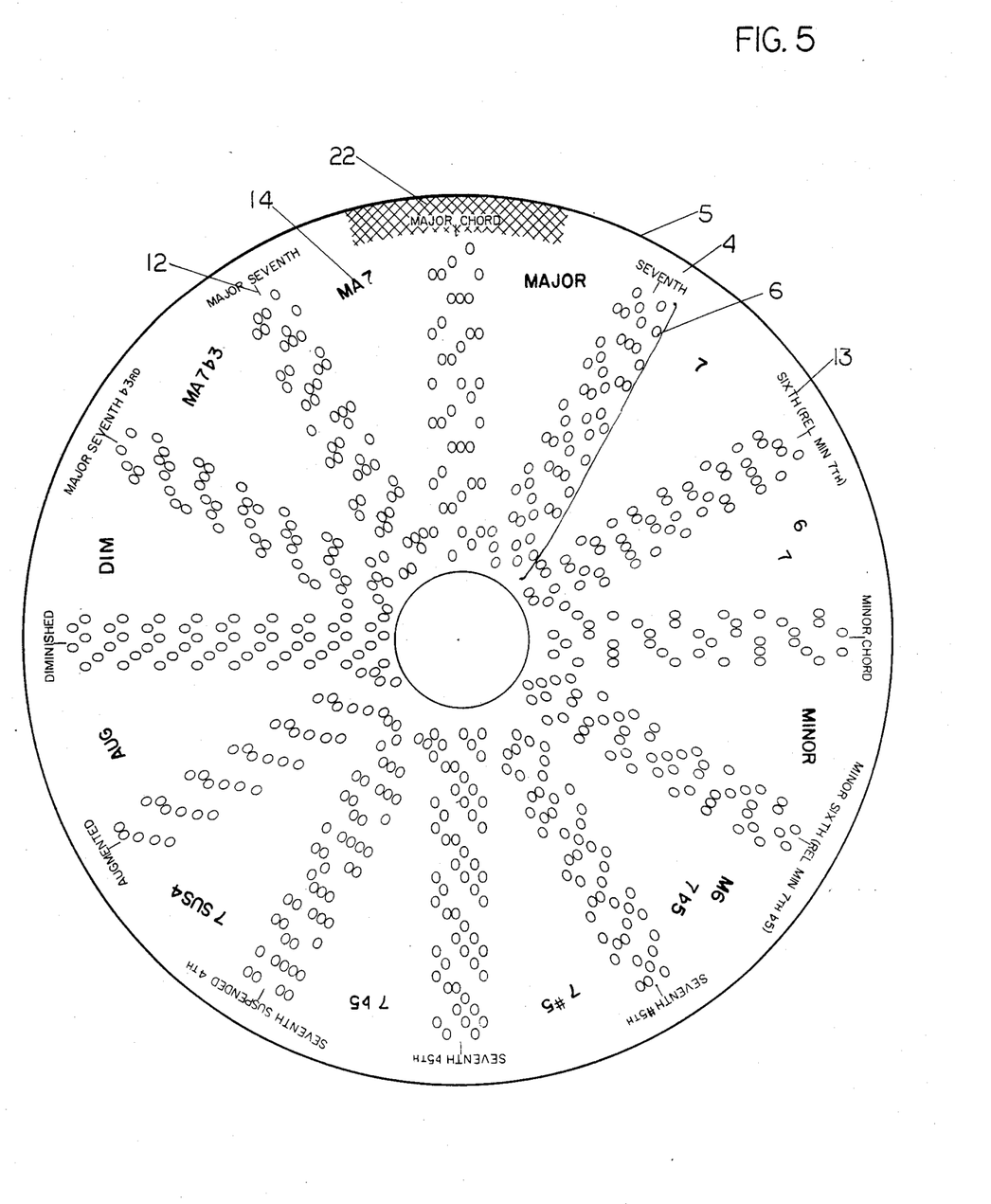
FIG. 5 is a front view of the rotatable disk showing in outline form 12 different patterns of spots representing 12 different types of chords.
Figure 6:
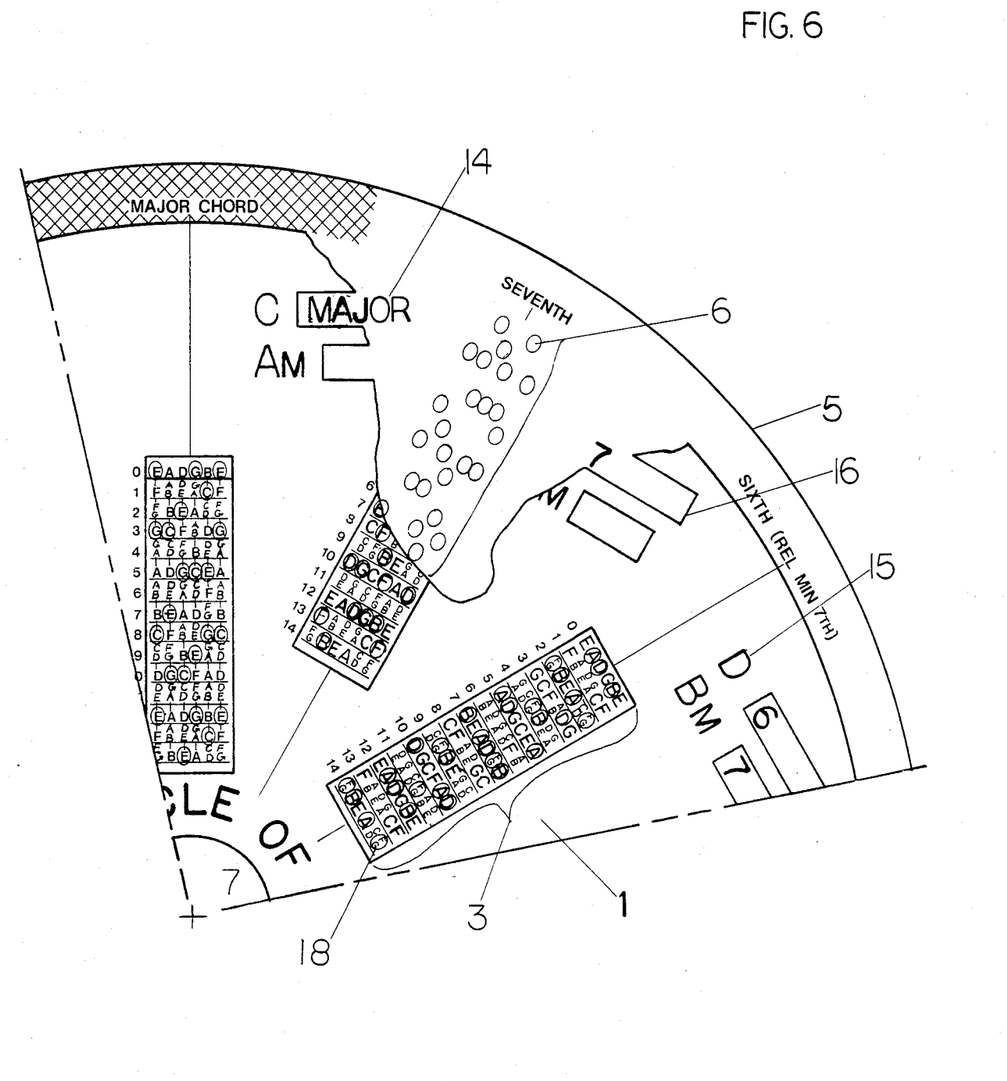
FIG. 6 is an enlarged cut-away view of FIG. 1.

The front side 4 of disk 5 has 12 angularly spaced patterns of spots 6 representing 12 distinct types of chords. Each pattern is identified by its name 13, e.g. MAJOR CHORD, imprinted in the peripheral area of the disk above the pattern. The same name is abbreviated in larger characters 14, e.g. MAJOR, to the right of the pattern.

Figure 4:
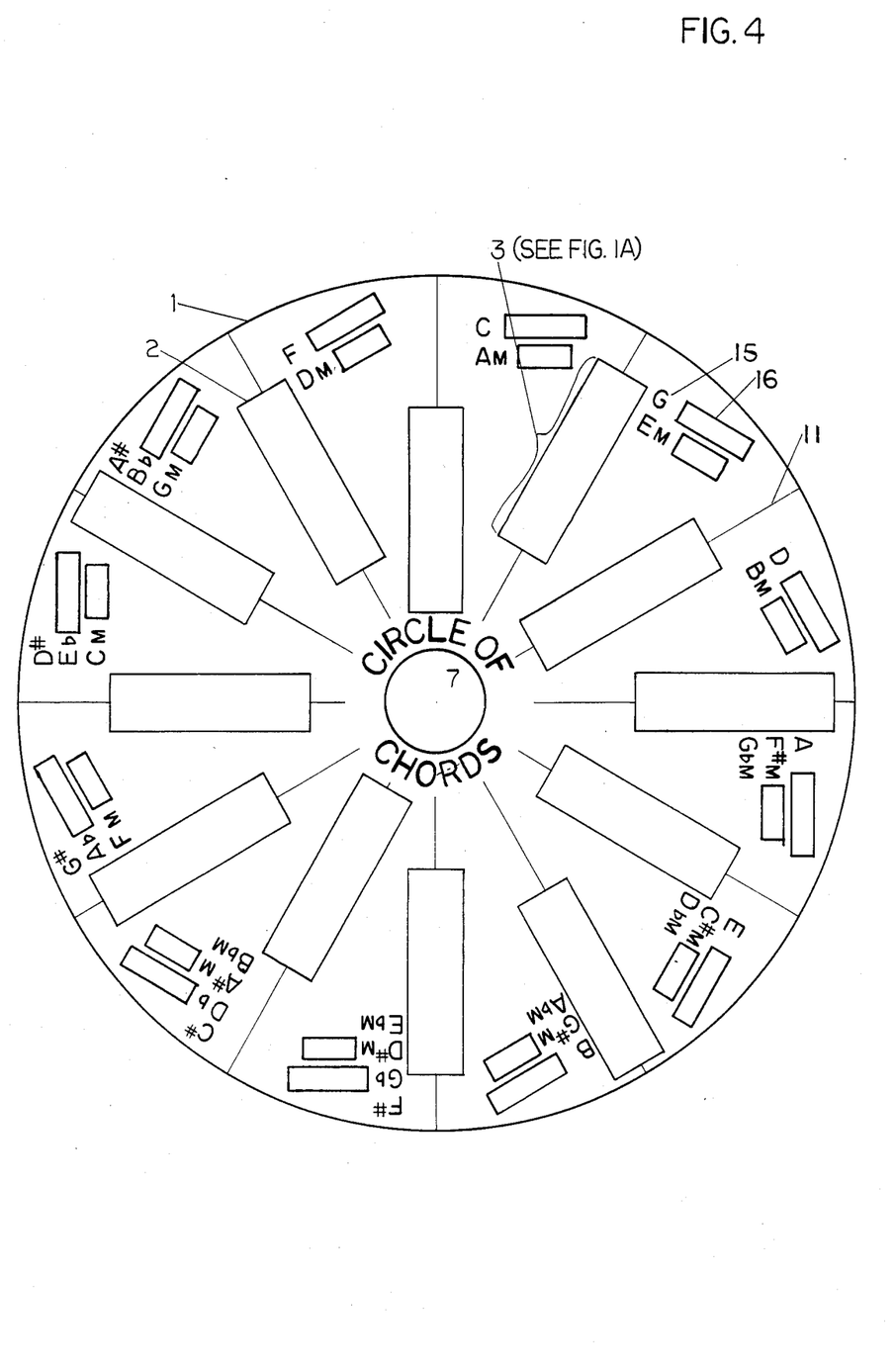
FIG. 4 is a front view showing only the front sheet of the device upon which are 12 identical representations of a guitar fingerboard inscribed in 12 different windows on the sheet.

The front sheet 1 has 12 angularly spaced windows 2 containing simulated fingerboards 3, each corresponding to the root note 15, e.g. C, of the chords that appear in that window. The root 15 is imprinted to the right of the simulated fingerboard 3 and is followed by a smaller window 16 to its right. The simulated fingerboard 3 is shown in detail in FIG. 1A, and only schematically in FIGS. 1, 2, and 4, due to size contraints.

When the disk 5 is properly aligned to display C MAJOR chords, for example, the words "MAJOR CHORD" appear above the "C" window and is confirmed by the word "MAJOR" appearing in the window 16 to the right of the letter "C". The complete name of the chords appearing on the simulated fingerboard is thus displayed in large characters, e.g. MAJOR.

Figure 7:
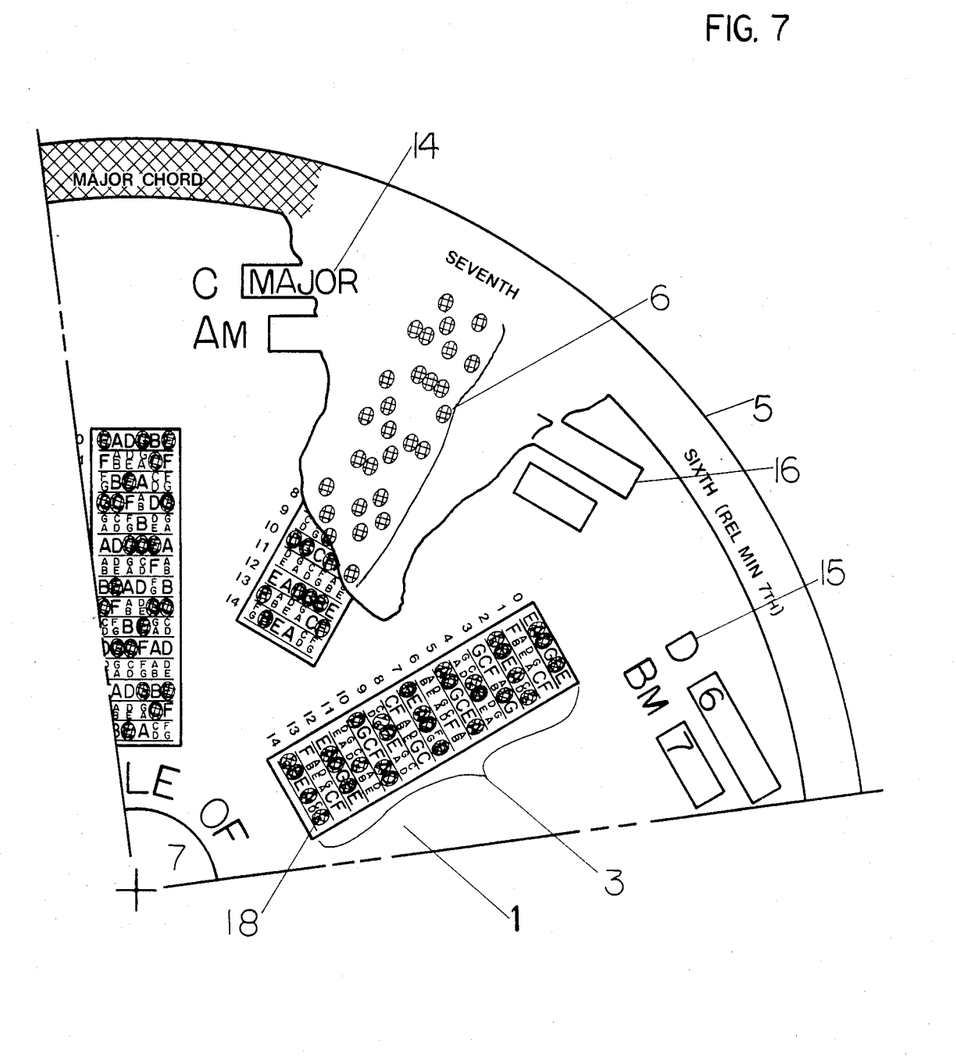
FIG. 7 is an enlarged cut-away view showing the spots and the MAJOR CHORD label in orange color for better visibility and orientation.

As an aid to the user, each finger position or open string on the simulated fingerboard 3 is identified by the letter(s) 17 corresponding to the note that may be sounded at that position. Further, each spot 18 designating a finger position or open string in the pattern of spots 6 may be given a brilliant fluorescent orannge tint in order to highlight it as shown in FIG. 7. Similarly in FIG. 7, the outlined areas surrounding the MAJOR CHORD label on the front and the AUGMENTED NINTH label on the rear of the rotatable disk may be tinted orange in order to orient the user.

The simulated fingerboard 3 (FIG. 1A) shows six strings 19 E-A-D-G-B-E, reading from the lowest to the highest musical pitch, the nut 20, and the frets 21, numbered 1 to 14 from the lowest to the highest pitch. The nut 20 is equivalent to the "0" fret at which the strings 19 are open and unstopped by the fingers.

Figure 1A:
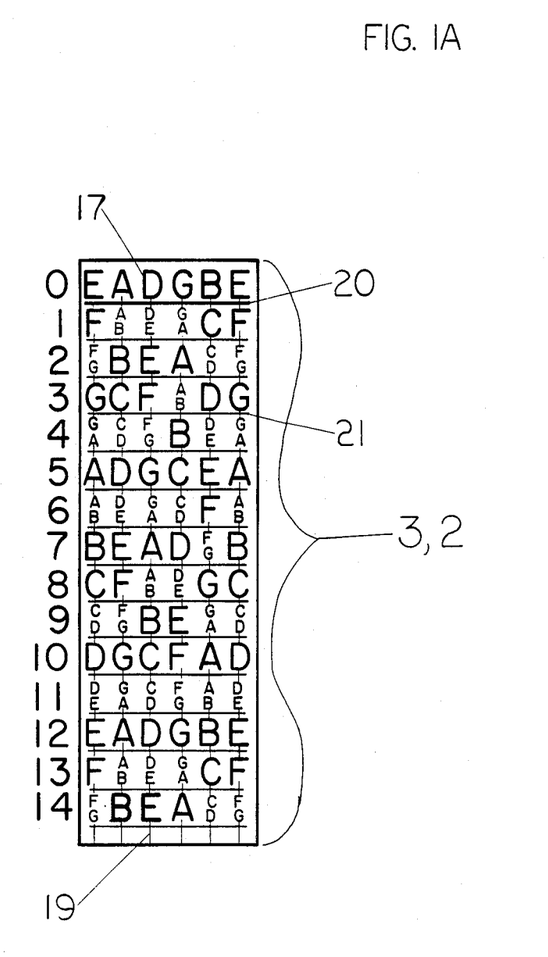
FIG. 1A is a detail of one of the simulated fingerboards of FIGS. 1, 2, and 4.

Next to the "1" fret appear the letters 17

$$F - \frac{A}{B} - \frac{D}{E} - \frac{G}{A} - C - F.$$

These letters identify the musical notes that sound if the respective strings 19 are stopped by depressing the fingers at that position and the strings are plucked. The notes are shown in abbreviated form so the letters $$\frac{A}{B}$$

for example, should be understood to be that musical note ordinarily identified as A♯ or B♭.

Although the actual frets on the guitar exceed 14 in number, the remaining frets can be easily visualized. The note sounded on the "12" fret is exactly one musical octave higher than the note on the "0" fret or open string. It is also identified by the same letter in the musical scale. Similarly, the note on the "13" fret is one octave higher than the note on the "1" fret and so on. In this way all the frets and corresponding notes can be easily visualized by extension from the simulated fingerboard.

In this particular embodiment of the invention, the root notes of the chords are angularly spaced in thr familiar form commonly referred to as the "circle-of-fifths." . In this form the notes rise by musical fifths around the circle in one direction and in musical fourths in the other direction. On sheet 1 the notes rise by musical fifths in the clockwise direction. On sheet 8 the direction is counter-clockwise, so the simulated fingerboards having the same root note are located precisely back to back.

If the root notes mentioned above are considered to be key notes, the circle-of-fifths identifies the major keys on its outer circle and the relative minor keys on the inner circle. With the further information that all the ordinary chords for a particular key are developed from the key note, the fourth and fifth above the key note, and their relative minors, the circle-of-fifths provides an excellent arrangement for quickly finding these ordinary chords.

On the rotatable disk 5, all the chords having a range less than one octave are located on the front side 4. All the chords exceeding the range of one octave, commonly referred to as polychords, are located on the rear side 9. The specific labels 22 for the MAJOR CHORD on the front side 4 and the AUGMENTED NINTH on the rear side 9 are in alignment back to back.

The natural arrangement of the circle-of-fifths and the particular arrangement of the patterns on the disk enable the user to find all the ordinary chords with no more than two settings of the disk. This is illustrated by the following detailed examples for using the present device, which from this point forward is called the "CIRCLE-OF-CHORDS". Also, the rotatable disk is called the "chord wheel".

Looking at SIDE 1 on CIRCLE-OF-CHORDS, turn the chord wheel so the "MAJOR CHORD" label is centered above the fingerboard pattern for the "C" chord. In the small window to the right of the large letter "C" the word "MAJOR" will appear, confirming that the chord wheel is in position. Now look into the window containing the pattern of the fingerboard and notice the orange spots. Observe that the notes C, E and G appear repeatedly in the orange spots. They are the three notes of the C MAJOR chord. Place your fingers on your guitar, choosing convenient positions corresponding to the orange spots. The notes C, E and G should be stopped by the fingers or appear on open strings at least once. The tonal quality of the chord will depend on the finger pattern selected.

Now look below the large letter "C" next to the fingerboard window and notice that the relative minor key is "Am". Without moving the chord wheel, look clockwise three musical fifths to the right for the "MINOR CHORD" label. It will be centered above the fingerboard window next to the large letter "A" and the small window displaying the word "MINOR". Looking into the fingerboard window, observe that the orange spots display the notes A, C and E of the A MINOR chord.

The basic chords for popular music are derived from the key note (tonic), the fifth note (dominant) of the musical scale and the fourth note (subdominant). On the CIRCLE-OF-CHORDS, starting on the tonic, the dominant is found in the ascending direction of the musical fifths and the subdominant in the descending direction. In the key of C the C MAJOR (tonic) chord, the G SEVENTH (dominant) and the F MAJOR (subdominant) are the basic major chords. The relative minor chords are, respectively, the A MINOR, the E MINOR SEVENTH and the D MINOR chords.

Observe that with the chord wheel positioned for the C MAJOR chord the "SEVENTH" chord label now appears above the "G" window. Read the finger positions for G SEVENTH chord through the window. Next, turn the "MAJOR CHORD" label counter-clockwise one fifth to the "F" window. Read the finger positions for the F MAJOR chord. This completes the three popular major chords for the key of C.

Remember that the relative minor of the F MAJOR chord is the D MINOR chord. Observe that the "MINOR CHORD" label is already above the "D" window. Without moving the chord wheel, look counter-clockwise one fifth to the left at the label. The "SIXTH" chord and the relative "MINOR SEVENTH" chord have the same finger positions. Observe that the E MINOR SEVENTH chord is visible in the window. This is confirmed by the designation "Em" appearing in the relative minor position and the "7" in the small window to the right. This completes the three relative minor chords.

Without moving the chord wheel, see SIDE 2 on the CIRCLE-OF-CHORDS. Notice that the C NINTH and the A MINOR NINTH chords are displayed. Other chords may be found by turning the chord wheel to the desired location.

Certain kinds of chords have additional characteristics that may be interesting to users. On SIDE 1 when the C MAJOR chord is displayed, for example, the C AUGMENTED and C DIMINISHED chords appear at the same time under the "AUGMENTED" and "DIMINISHED" labels. This occurs because the C, E, G♯ AND A♭ AUGMENTED chords are all composed of the same notes. Similarly, the A, C, D♯, E♭, F♯ and G♭ DIMINISHED chords all have the same notes. On SIDE 2, the THIRTEENTH chord is acutally the MAJOR SCALE beginning with the dominant as root of the chord. Likewise, the SIXTH ADDED 9th chord, often used for tonal color, is actually the PENTATONIC SCALE beginning with the subdominant.

Figure 8:
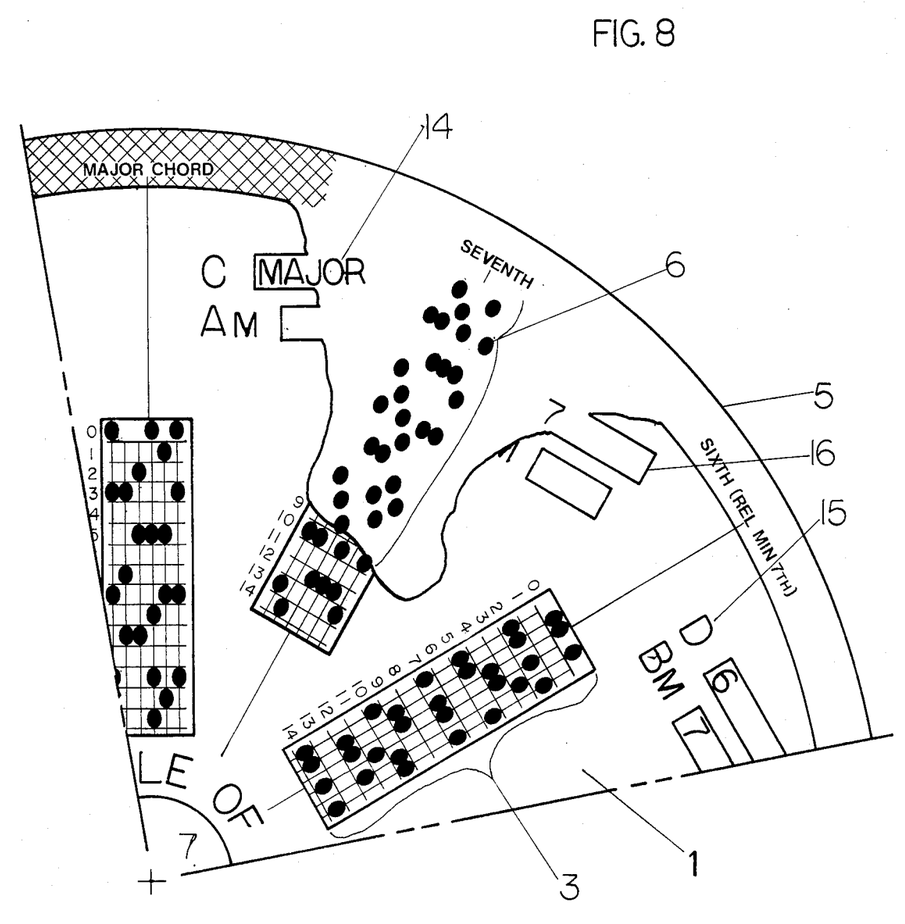
FIG. 8 is an enlarged cut-away view showing a plainer version without any notes lettered on the fingerboard and with black spots only on the rotatable disk.

The preferred embodiment of this invention allows for certain variations from the basic design. For illustration, FIG. 8 shows a plainer version of the device without any lettering on the simulated fingerboard to identify the notes and with black spots on the rotatable disk.

The present embodiment is not intended to limit the distinct different types and numbers of chords to those shown. For example, the number of distinct types of chords can be increased if the diameter of the device is increased or if the simulated fingerboards are reduced in scale proportionately while the original diameter is maintained. Additional rings of fingerboard patterns can be outside of the ring shown in the drawings. In this version there is enough space available to display simultaneously all the ordinary chords for a particular musical key in a single setting of the rotatable disk.

Accordingly, it is to be understood that the embodiments of the invention herein described are merely illustrative of the application of the principles of the invention. Reference herein to details of the illustrated embodiments is not intended to limit the scope of the claims which themselves recite those features regarded as essential to the invention.

I claim:

1. A device to display musical chords for fretted string instruments comprising: (a) a sheet member having transparent portions upon which a plurality of patterns representing the strings and frets of a fingerboard are inscribed, said fingerboard patterns being disposed angularly about a central point on said sheet member and displaced incrementally according to the spacing between frets, each fingerboard pattern being identified by a certain root note in a musical chord; (b) a pivot member located at said central point on the sheet; (c) rotatable disk means imprinted with a plurality of patterns of spots, each pattern of spots corresponding to a certain type of chord, whereby the disk may be rotated about the pivot to align a particular pattern of spots on the disk with a particular fingerboard pattern on the above-mentioned sheet, displaying the finger positions and open strings that may be sounded to play a certain musical chord.

2. A device as described in claim 1 in which the letter designations of the musical notes are inscribed on the fingerboard pattern.

3. A device as described in claim 1 in which the spots of the disk means, representing the finger positions or open strings, are imprinted in outline form.

4. A device as described in claim 3 in which the spots of the disk means are imprinted in tones or colors that contrast with the disk and with the fingerboard pattern.

5. A device as described in claim 4 in which the spots of the disk means are brightly tinted or printed in fluorescent colors.

6. A device as described in claim 1 in which the patterns of spots of the disk means are arranged relative to the fingerboard patterns so a plurality of related chords, including different root notes and types of chords, may be displayed simultaneously.

7. A device as described in claim 1 in which the fingerboard patterns and the patterns of spots of the disk means are angularly and radially arranged about the pivot center so any pattern of spots may register with any fingerboard pattern upon rotation of the disk.

8. A device as described in claim 1 in which the fingerboard patterns and patterns of spots of the disk means are correspondingly arranged and regularly spaced at equal angles about the pivot center so when any pattern of spots is aligned with any fingerboard pattern, other patterns of spots simultaneously register with other fingerboard patterns.

9. A device as described in claim 1 in which there are 12 fingerboard patterns, each identified by a different root note corresponding with one of the 12 notes of the chromatic scale.

10. A device as described in claim 9 comprising indicia identifying each fingerboard pattern by both the root note in a major key and the corresponding root note in the relative minor key.

11. A device as described in claim 10 in which the fingerboard patterns are arranged in a "circle-of-fifths" and each fingerboard pattern, as identified by its root note, adjoins its musical fifth.

12. A device as described in claim 1 in which the rotatable disk means is imprinted with additional patterns of spots on its rear side and an additional sheet member inscribed with fingerboard patterns is disposed to cooperate with said rear patterns of spots.

13. A device as described in claim 12 in which the additional rear sheet member is affixed through the pivot member to the front sheet member.

14. A device as described in claim 13 in which the rear patterns of spots are aligned with the rear fingerboard patterns when the front patterns of spots are aligned with the front fingerboard patterns, thereby displaying a plurality of musical chords in registration simultaneously on both the front and rear sides of the device.

* * * * *